US006969053B2

(12) United States Patent
Kawada et al.

(10) Patent No.: US 6,969,053 B2
(45) Date of Patent: *Nov. 29, 2005

(54) STRUT MOUNT

(75) Inventors: Michihiro Kawada, Osaka (JP); Hideo Tadano, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 320 days.

This patent is subject to a terminal disclaimer.

(21) Appl. No.: 10/030,778

(22) PCT Filed: May 16, 2001

(86) PCT No.: PCT/JP01/04091

§ 371 (c)(1),
(2), (4) Date: Jan. 7, 2002

(87) PCT Pub. No.: WO02/30694

PCT Pub. Date: Apr. 18, 2002

(65) Prior Publication Data
US 2003/0189278 A1    Oct. 9, 2003

(30) Foreign Application Priority Data
Oct. 11, 2000  (JP) .............................. 2000-310055

(51) Int. Cl.⁷ ............................................ B60G 15/06
(52) U.S. Cl. ...................... 267/292; 411/179; 411/180; 411/183; 280/124.155; 267/220
(58) Field of Search .................. 280/124.155, 124.147, 280/124.152; 267/292, 293, 294, 220, 153, 267/141, 141.4, 141.5, 141.2, 141.3; 43/226; 411/179, 968, 180, 183, 957; 188/321.11; 248/635

(56) References Cited

U.S. PATENT DOCUMENTS

| 4,432,681 A | * | 2/1984 | Capuano ..................... 411/180 |
| 6,220,804 B1 | * | 4/2001 | Pamer et al. ............... 411/180 |
| 6,244,607 B1 | * | 6/2001 | Nishino ............... 280/124.107 |

(Continued)

FOREIGN PATENT DOCUMENTS

EP           1219474       * 7/2002

(Continued)

OTHER PUBLICATIONS

Translations of JP 60-161606, JP 61-206143, JP620414235, JP 62062032A, jp10019079, JP2000027925A, JP2000072036A.*

(Continued)

Primary Examiner—Douglas C. Butler
(74) Attorney, Agent, or Firm—Knobbe Martens Olson & Bear, LLP

(57) ABSTRACT

The present invention provides a strut mount comprising an inner member (12) to which an upper extremity of a rod of a buffer is fixed, an outer member (14) attached to a vehicle while surrounding an outer circumference of the inner member, and an elastomer (16) interposed between both members to dampen vibration, wherein an attachment piece (28) of an outer fitting (14) and an attachment plate (2) of the vehicle body are curved in the form of a sphere to raise rigidity and improve vehicle running stability. Besides, a non-fastening surface portion (36) is provided by being lowered via a different level portion (34) around a bolt fastening surface portion (30) of the attachment piece (28), preventing rubber burr from being produced on the fastening surface. Furthermore, by the use of a caulking nut (52) stuck to the underside of the attachment piece (28), the weight of the products can be reduced, and cost reduction is accomplished by laborsaving during operations.

10 Claims, 7 Drawing Sheets

U.S. PATENT DOCUMENTS

| | | | |
|---|---|---|---|
| 6,712,370 B2 * | 3/2004 | Kawada et al. | 280/124.155 |
| 2002/0163155 A1 * | 11/2002 | Kawada et al. | 280/124.155 |

FOREIGN PATENT DOCUMENTS

| | | |
|---|---|---|
| JP | 60-161606 | 10/1985 |
| JP | 61-206143 | 12/1986 |
| JP | 62041435 | 2/1987 |
| JP | 62062032 A | 3/1987 |
| JP | 63-36804 | 9/1988 |
| JP | 2-25049 | 5/1990 |
| JP | 4-121557 | 10/1992 |
| JP | 7-3245 | 1/1995 |
| JP | 10019079 | 1/1998 |
| JP | 2000027925 A | 1/2000 |
| JP | 2000072036 A | 3/2000 |
| WO | WO 02/30694 * | 4/2002 |
| WO | WO 02/30694 A1 * | 4/2002 |
| WO | WO 02/32701 * | 4/2002 |

OTHER PUBLICATIONS

Translation of claims 1-13 of WO 02/30694 A1.*

STIC translation of JP 63-36804.*

* cited by examiner

100 # STRUT MOUNT

This application is the U.S. National Phase under 35 U.S.C. §371 of International Application PCT/JP01/04091, filed May 16, 2001, which claims priority to Japanese Patent Application No. 2000-310055, filed Oct. 11, 2000.

FIELD OF THE INVENTION

This invention relates to a strut mount disposed at an attachment portion of a buffer to a vehicle.

DESCRIPTION OF THE RELATED ART

In general, in a suspension system of an automobile, etc., a so-called strut mount is disposed at an attachment portion of a buffer to a vehicle body, in order to control vibration, etc. propagated from wheels to the vehicle body.

FIG. 12 shows an example of a conventional strut mount. The strut mount 100 comprises an inner fitting 101 in which the upper extremity of a piston rod 110 of a shock absorber is inserted, an outer fitting 102 attached to the vehicle body side, and a rubber elastomer 103 interposed between both fittings to dampen input vibration. The rod 110 inserted into the inner fitting 101 is fixed to the inner fitting 101 when being fastened by a nut 104. The outer fitting 102 is provided with an attachment piece 105, to which a bolt 107 inserted into a bolt hole 106 thereof from below is press fitted and secured. With the bolt 107 lifted up so as to insert into a bolt hole 113 of the vehicle body's attachment plate 112 from below, by tightening a nut 108 from above the attachment plate 112 of the vehicle body, the strut mount 100 will be attached to the vehicle body only by attachment working from above.

Incidentally, it is necessary to secure high rigidity to improve vehicle running stability for the attachment plate 112 of the vehicle body, to which the strut mount 100 is attached. Although the thickness of the attachment plate 112 in the form of a plane has been thickened to secure such high rigidity so far, securing adequate rigidity is required for even thin plate thickness, in keeping with weight reduction of the vehicle in recent years.

DISCLOSURE OF THE INVENTION

In view of the aforementioned points, an object of the present invention is to provide the improvement of vehicle running stability by raising the rigidity of the attachment structure of a strut mount to a vehicle.

A strut mount according to a first embodiment of the present invention comprises an inner member to which the upper extremity of a rod of a buffer is fixed, an outer member attached to the vehicle while surrounding an outer circumference of the inner member, and an elastomer interposed between the inner and outer members to dampen vibration, wherein the outer member is provided with an attachment piece that is fitted and secured to an attachment plate of the vehicle from underneath, the attachment piece being curved in the form of a partial sphere corresponding to the shape of the lower surface of the attachment plate curved in the form of a partial sphere.

Thus, by curving both the attachment piece of the outer member and the attachment plate of the vehicle body in the form of a sphere, rigidity can be raised without thickening the attachment plate of the vehicle body to improve vehicle running stability. Hereupon, the form of a sphere denotes a curved surface forming a part of a sphere.

Incidentally, when the attachment piece of the outer member is curved in the form of a partial sphere, the surface fastening to the vehicle body is also in the form of a partial sphere. Accordingly, when a rubber elastomer is formed, it poses a problem that a rubber burr is liable to be produced when a rubber comes into the fastening surface. Since a bolt cannot be tightened by a predetermined torque due to the presence of the rubber burr and deteriorated rubber may cause the tightened bolt to be loosened, it is necessary to get rid of the rubber burr after forming, leading to a cause of higher working cost.

Therefore, the present invention provides a strut mount according to a second embodiment that the elastomer is a rubber elastomer stuck to the inner and outer members by means of die forming, the outer member being equipped with an attachment piece fitted and secured to an attachment plate of a vehicle from underneath, the attachment piece being equipped with a fastening surface portion that is exposed from the rubber elastomer and tightened to the attachment plate of the vehicle by the bolts, and non-fastening surface portion being provided so as to be lowered via a different level portion around the fastening surface portion.

As for the strut mount, when forming the rubber elastomer, the rubber is prevented from coming into the fastening surface portion by pressing the forcing surface portion provided on the forming die against the non-fastening surface portion. That is, according to the second embodiment, since the non-fastening surface portion is provided so as to be lowered via a different level portion around the fastening surface portion of the attachment piece, the non-fastening surface portion can serve as a sealing surface portion to prevent the rubber in a cavity of the forming die from getting into the fastening surface, thus preventing the rubber burr from producing on the fastening surface.

Thus, the second embodiment is to prevent the rubber from coming into the fastening surface portion by pressing the forcing surface portion of the forming die against the non-fastening surface portion. However, since the forcing surface portion is pressed against the non-fastening surface, any effect is not produced on fastening to the attachment plate of the vehicle body even if any surface becomes rough due to forcing or urging. Accordingly, a sealing protrusion can be provided on the forcing surface portion of the forming die and pressed against the non-fastening surface portion, thus capable of preventing the rubber more effectively from coming into the fastening surface. Furthermore, since the non-fastening surface portion can be configured in the form of a plane as against the spherical fastening surface portion, it is easy for the forming die to press the non-fastening surface portion.

As aforementioned, when both the attachment piece of the outer member and the attachment plate of the vehicle body are curved in the form of a sphere, it is also desired to devise the bolt fastening structure to secure both the attachment piece and plate. That is, as shown in FIG. 11, as for the strut mount in which the bolt 203 is fitted and secured to the attachment piece 202 of the outer fitting 201, when the attachment piece 202 of the outer fitting 201 and the attachment plate 210 of the vehicle body are curved in the form of a sphere, each bolt 203 fitted and secured to the attachment piece 202 is disposed toward individual inclined direction as against the direction of movement (perpendicularly) when the strut mount is lifted up. For that purpose, it is necessary to enlarge a bolt hole 211 of the attachment plate 210 so that the bolt 203 turned toward the inclined direction can be inserted. However, if the bolt hole 211 is large, it is feared that the problems in bolt fastening such as looseness may be posed. Therefore, a means for inserting the bolt without making the bolt hole larger and for tightening the bolt only by operations from above is required.

Accordingly, the present invention is to provide a strut mount according to a third embodiment by providing a nut under the attachment piece of an outer member, screwing a bolt into the nut from above the attachment plate of the vehicle body, inserting the bolt without making the bolt hole larger, and tightening the attachment piece of the outer member to the underneath of the attachment plate of the vehicle body with a bolt.

When providing the nut for the attachment piece of the outer member, a technique that a small hole is formed at a prescribed position on the attachment piece, that a burr is formed (burring working) downwardly around the circumferential edge of the hole as a cylindrical portion, and that an inner circumferential surface of the cylindrical portion is tapped and cut as screw threads to serve as a nut, makes its working difficult and complicated. Furthermore, in order to elongate the nut of a given diameter and cut the required screw threads, it is necessary to thicken the attachment piece, with the result that the weight of the components grows heavier. Besides, as for the method of welding a nut on the underside of the attachment piece of the outer member, in order to avoid deterioration of rubber elastomer due to welding heat, it is necessary to weld the nut before working the strut mount or to escape welding heat by masking around the nut of the attachment piece, whereby making the strut mount working difficult and complicated.

Accordingly, the third embodiment adopts a nut caulked and secured on the lower surface side of the attachment piece. By caulking and securing the nut in this manner, it is possible to make the thickness of the outer member thinner to reduce the weight of the components, and also to prevent heat that causes the rubber elastomer to be deteriorated, without causing any difficult and complicated working.

A means for caulking and securing the nut is to form a nut attachment hole on the attachment piece of the outer member and to insert the caulking nut having a cylindrical portion from underneath the attachment piece. When the cylindrical portion is caulked and upset, an outer circumferential surface of the cylindrical portion is stuck fast to an inner circumferential surface of the nut attachment hole, thus capable of sticking the nut on the lower surface side of the attachment piece.

With the cylindrical portion of the caulking nut inserted into the nut attachment hole from the underside, by pressurizing the circumference of the nut attachment hole from the direction square to the plate surface of the attachment piece to upset the nut attachment hole, the inner circumferential surface of the nut attachment hole is stuck fast to the outer circumferential surface of the cylindrical portion to stick the nut on the lower surface side of the attachment piece.

At this time, provided that the outer circumferential surface of the cylindrical portion of the caulking nut is corrugated, an extra wall surrounding the nut attachment hole cuts into the corrugated outer circumferential surface of the cylindrical portion as the nut attachment hole is diminished in diameter, the extra wall acts as a steady rest to restrain the caulking nut from turning together with the bolt.

BEST MODE FOR CARRYING OUT THE INVENTION

The strut mount 10 according to the first embodiment of the present invention is explained on the basis of FIGS. 1 to 5.

Figure 1:
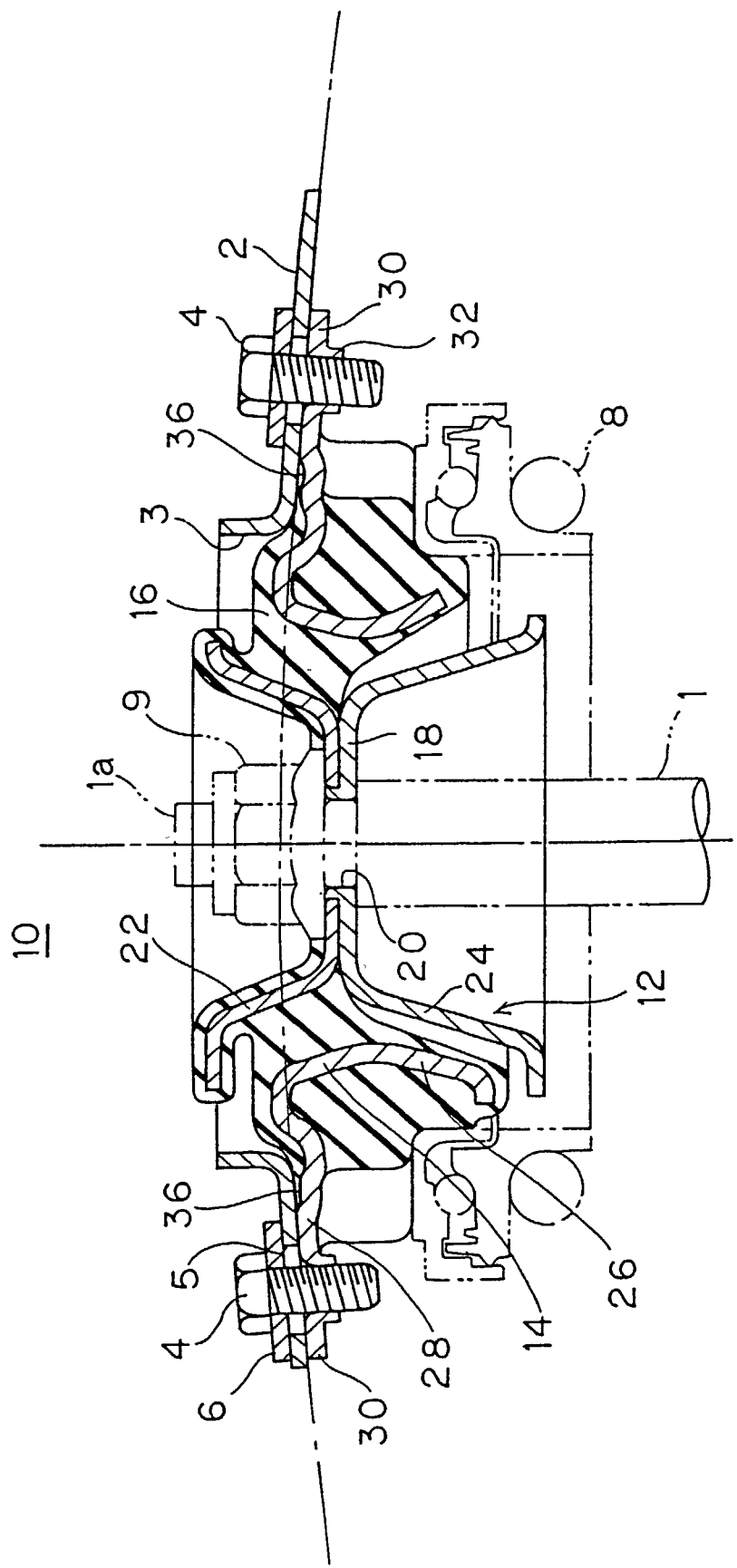
FIG. 1 is a sectional view of a strut mount of a first embodiment of the present invention and a sectional view taken on line A—A of FIG. 2.

As shown in FIG. 1, the strut mount 10 comprises an inner fitting 12 which is fixed by inserting an upper extremity 1a of a piston rod 1 of a shock absorber from below, an outer fitting 14 attached to the vehicle body side, surrounding an outer circumference of the inner fitting 12, and a rubber elastomer 16 in the form of a ring interposed between the inner and outer fittings 12, 14 to unite both in one piece, and is attached to an attachment plate 2 of the vehicle body, curved in the form of upwardly convex sphere. The attachment plate 2 of the vehicle body has an opening 3, to which the strut mount 10 is assembled from below.

The inner fitting 12 is a roughly tubular steel product disposed on the inside of the rubber elastomer 16, and at its outer circumferential surface an inner circumferential surface of the rubber elastomer 16 is vulcanization bonded. The inner fitting 12 has a circular fixed surface portion 18 square to the rod 1, an opening 20 is provided at the center of the fixed surface portion 18, and the rod 1 is fixed to the fixed surface portion 18 by a nut 9 under a condition of being inserted into the opening 20. The inner fitting 12 comprises a first member 22 in the form of a cup having upward opening with the fixed surface portion 18 as a bottom surface, a second member 24 in the form of a cup having downward opening to receive the upper extremity of the rod 1 from below, and the fixed surface portion 18 is formed by jointing both bottom surfaces of the first and second members 22, 24. The second member 24 serves as a seat for a bound bumper.

The outer fitting 14 is a steel product comprised of a cylindrical portion 26 disposed nearly parallel to the inner fitting 12 so as to cover the inner fitting 12 from outside and an attachment piece 28 extendedly disposed outwardly in the direction square to the axial direction from the upper extremity of the cylindrical portion 26, and embedded in the rubber elastomer 16. At the attachment piece 28, the outer fitting 14 is tightened on the underside of the attachment plate 2 of the vehicle body by the bolt. For that purpose, the attachment piece 28 is curved in the form of a sphere of upwardly convex in corresponding with a shape of the lower surface of the attachment plate 28.

Figure 2:
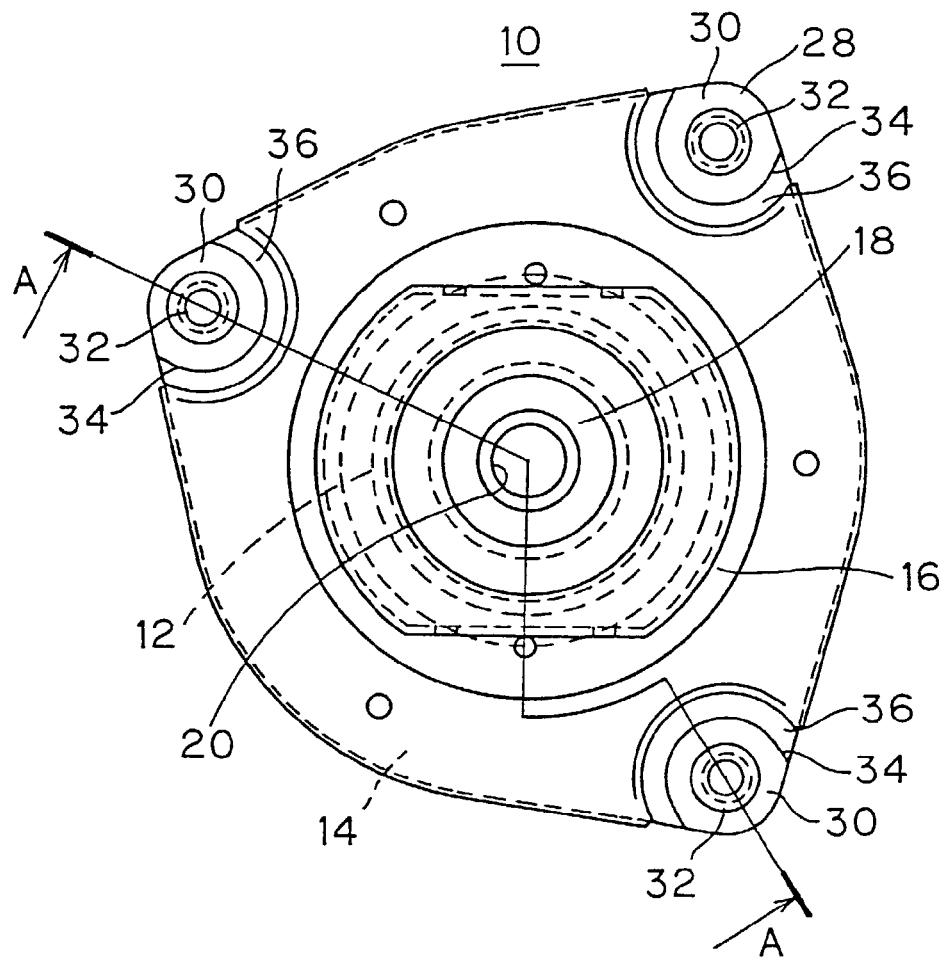
FIG. 2 is a plan view of the strut mount.

The attachment piece 28 is provided with a fastening surface portion 30 exposed from the rubber elastomer 16 and fastened to the attachment plate 2 of the vehicle body by the bolt. In this embodiment, the fastening surface portion 30 is provided at three points at a circumferential edge of the outer fitting 14 as shown in FIG. 2. A nut 32 screwed by the bolt 4 inserted from the upper side of the attachment plate 2 of the vehicle body is provided integrally on the fastening surface portion 30 by burring working.

Figure 3:
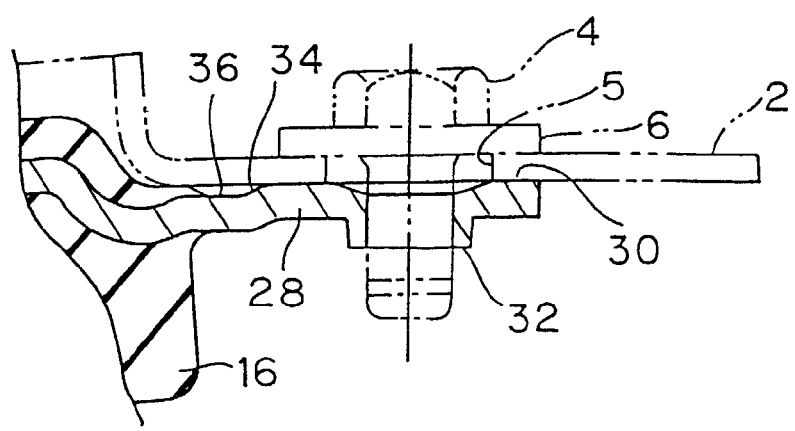
FIG. 3 is an enlarged sectional view showing the attachment structure of the strut mount to a vehicle body.

As shown in FIGS. 2, 3, a non-fastening surface portion 36 lowered via a different level portion 34 is provided so as to surround the fastening surface portion 30. The fastening surface portion 36 is formed in the form of a plane with respect to the spherical fastening surface portion 30, lower than the fastening surface portion 30 by one step. Therefore, the non-fastening surface portion 36 is disposed oppositely via a slight clearance under a condition where the attachment piece 28 is fixed to the attachment plate 2 of the vehicle body, with non-contacting condition with the underneath of the attachment plate 2.

Figure 4:
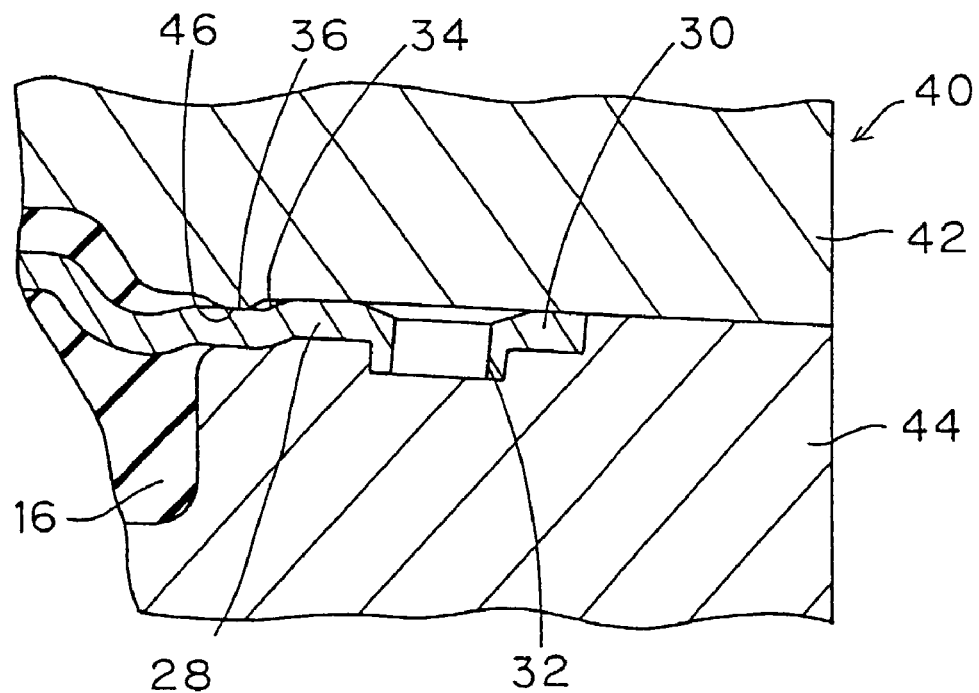
FIG. 4 is an enlarged sectional view of the strut mount during vulcanization forming.

When producing the strut mount 10, the rubber elastomer 16 is vulcanization formed with the first member 22 of the inner fitting 12 and the outer fitting 14 set up in a die 40. At this time, as shown in FIG. 4, the fastening surface portion 30 of the attachment piece 28 is in the state of being exposed from the rubber elastomer 16 when being interposed between an upper die 42 and a lower die 44. A forcing surface portion 46 forcing the non-fastening surface portion 36 is provided for the upper die 42 disposed on the upper surface side of the attachment piece 28. The forcing surface portion 46 is provided so as to be pressed against the non-fastening surface portion 36 around the fastening surface portion 30, instead of the fastening surface portion 30, when closing the dies. The rubber is thus prevented from coming into the fastening surface portion 30 outside of the non-fastening surface portion 36 by pressing the forcing surface portion 46 against the non-fastening surface portion 36.

When attaching the strut mount 10 as described above to the vehicle body, lift up the strut mount 10 so that the inner fitting 12 inserts through the opening 3 of the attachment plate 2 of the vehicle body, align the nut 32 on the fastening surface portion 30 to the underside of the bolt hole 5 of the attachment plate 2, and screw the bolt 4, vertically inserted via a washer 6 from above the attachment plate 2 through the plate surface, into the nut 32. Thus, the fastening surface portion 30 of the outer fitting 12 is fastened to the attachment plate 2 of the vehicle body by the bolt to complete attachment of the strut mount.

According to the configuration described above, curving the attachment piece 28 of the outer fitting 14 and the attachment plate 2 of the vehicle body in the form of a sphere allows the attachment portion of the strut mount 10 to have high rigidity, bringing about good running properties.

Since the rubber is prevented from coming into the fastening surface portion 30 during vulcanization forming by means of the non-fastening surface portion 36, a rubber burr can be avoided from producing at the fastening surface to the vehicle body.

Figure 5:
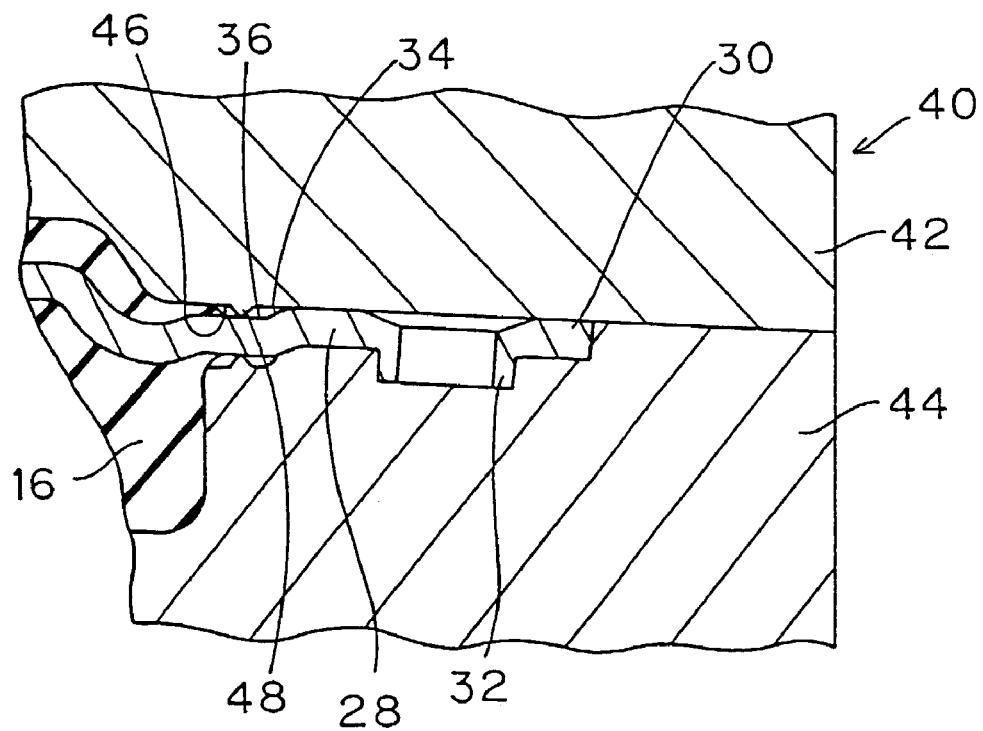
FIG. 5 is a sectional view showing an example of modification of vulcanization forming shown in FIG. 4.

FIG. 5 shows an example of modified forcing surface portion 46 in the aforementioned embodiment. In this example, a sealing protrusion 48 with a sectional shape of roughly triangle is provided, extending along the different level portion 34, for the forcing surface portion 46, and pressed against and cut into the non-fastening surface portion 36. The sectional shape of the sealing protrusion 48 is not limited to a triangle, and semi-circular and rectangular shape may also be used.

Although irregularities are produced on the surface against which the protrusion 48 is cut and pressed, it does not have an influence on fastening to the attachment plate 2 of the vehicle body because of non-fastening surface portion 36. And, by making the sealing protrusion 48 cut into the surface, the rubber coming into the fastening surface portion 30 can be blocked more effectively, thus further favorably preventing the rubber burr on the fastening surface from being produced.

Then, the strut mount 50 according to the second embodiment is explained on the basis of FIGS. 6 to 10.

The second embodiment differs from the first embodiment in that a caulking nut 52 is provided, instead of the aforementioned nut 32 produced by the burring working, as a nut screwed by the bolt 4 that serves to fasten the outer fitting 14 to the vehicle body. Explanation of the points, to which the same number as the first embodiment is designated, is omitted because of the same structure.

Figure 6:
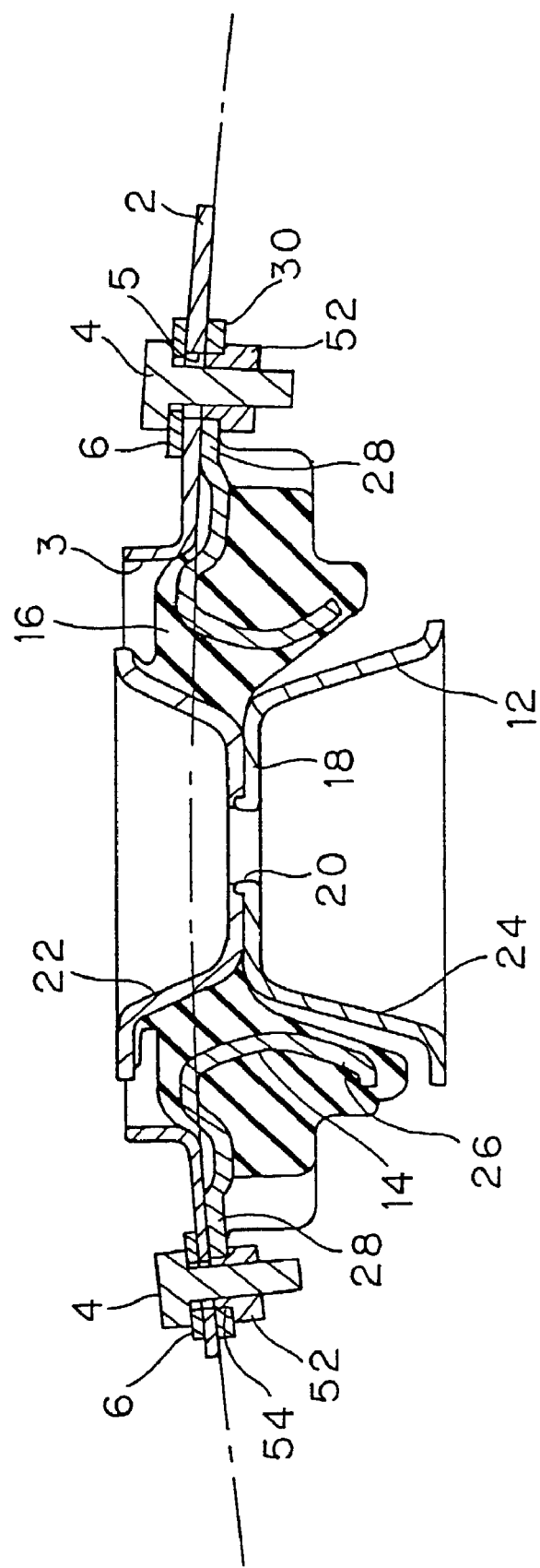
FIG. 6 is a sectional view of a strut mount according to a second embodiment.
Figure 7:
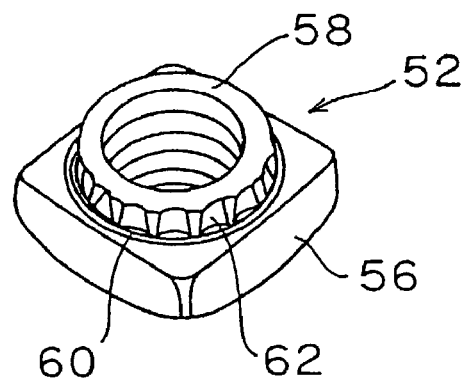
FIG. 7 is a perspective view of a caulking nut according to the second embodiment.
Figure 8:
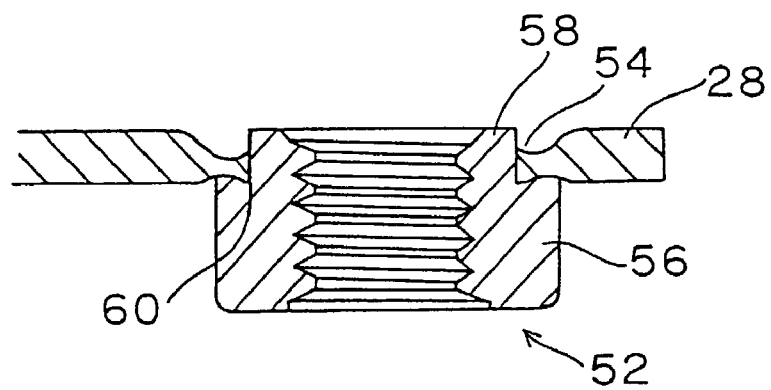
FIG. 8 is a sectional view showing the state of the caulking nut sticking fast to the attachment hole.

As shown in FIG. 6, on the fastening surface portion 30 for the attachment piece 28 of the outer fitting 14, a nut attachment hole 54 is provided, to which a caulking nut 52 is stuck. As shown in FIGS. 7, 8, the caulking nut 52 comprises a nut portion 56 disposed on the underside of the attachment piece 28 and a cylindrical portion 58 inserted into the nut attachment hole 54 from the underside. On the inner circumferential surface of the nut portion 56 and the cylindrical portion 58, screw threads are cut continuously, wherein the bolt 4 is screwed. The caulking nut 52 is stuck to the nut attachment hole 54, the circumference of which, on the attachment piece 28, is pressurized and caulked, which is then diminished in diameter. For the purpose of making harder than the attachment piece 28, the caulking nut 52 is a hardened steel product.

Having larger diameter than the nut attachment hole 54, the nut portion 56 gets caught in the circumferential edge of the nut attachment hole 54 so as not to slip through and come out of the attachment piece 28 upwardly. A groove 60 is made around the cylindrical portion 58 on the upper surface of the nut portion 56, so that the extra wall of the attachment piece 28 cuts into there when pressurizing the circumference of the nut attachment hole 54.

The cylindrical portion 58 has an outside diameter enough to be inserted into the nut attachment hole 54, and its outer circumferential surface is corrugated 62 so that the extra wall of the attachment piece 28 cuts into the cylindrical portion 58 when pressurizing the circumference of the nut attachment hole 54. The closer to the base extremity side (lower side) the cylindrical portion 58 reaches, the deeper the corrugation 62 is formed on the outer circumferential surface. The extra wall being cut into serves to restrain the caulking nut 52 from slipping through downward.

The procedure of attaching the strut mount 50 to the attachment plate 2 of a vehicle body is described below. First, the cylindrical portion 58 of the caulking nut 52 is inserted from below into the nut attachment hole 54 of the strut mount 50 being assembled, and then the circumference of the nut attachment hole 54 of the attachment piece 28 is pressurized and caulked from above. At this time, the nut attachment hole 54 is diminished in diameter, and the inner circumferential surface thereof is stuck fast to the cylindrical portion 58. Further, the extra wall of the attachment piece 28 cuts into the corrugation 62 on the outer circumferential surface of the cylindrical portion 58, whereby forming a steady rest that restrains the bolt 4 from turning together with the caulking nut 52, with the result to secure a predetermined turning torque. Being made of hardened steel, the caulking nut 52 will not be deformed.

With the strut mount lifted up so that the inner fitting 12 passes through the opening 3 of the attachment plate 2 of the vehicle body, and also with the underside of the bolt hole 5 on the attachment plate 2 aligned with the bolt hole of the caulking nut 52, provided that the bolt 4 inserted vertically into the plate surface from above the attachment plate 2 through a washer 6 is screwed into the caulking nut 52 and the attachment piece 28 of the outer fitting 14 is bolted to the attachment plate 2 of the vehicle body, attachment of the strut mount 50 is completed.

According to the configuration described above, since the bolt 4 can be inserted perpendicularly to the plate surface even when the attachment plate 2 of the vehicle body is curved, it is not necessary to make the bolt hole 5 of the attachment plate 2 larger, and problems such as looseness can be dissolved. Further, since the attachment piece 28 is caulked to secure the caulking nut 52, it is not necessary to thicken the attachment piece 28 of the outer fitting 14 just like in the case of burring working, so that the weight of the components can be reduced. Besides, because the nut is not welded, post working can easily be performed even after vulcanization forming of the rubber, capable of laborsaving during operations and reducing cost.

Figure 9:
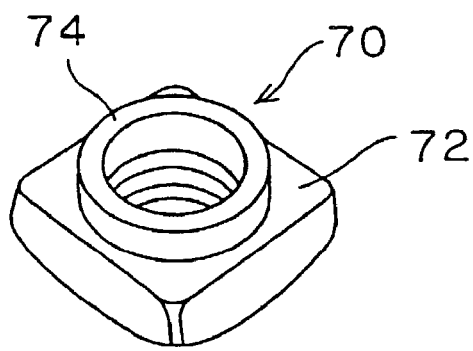
FIG. 9 is a perspective view showing an example of modification of the caulking nut.
Figure 10:
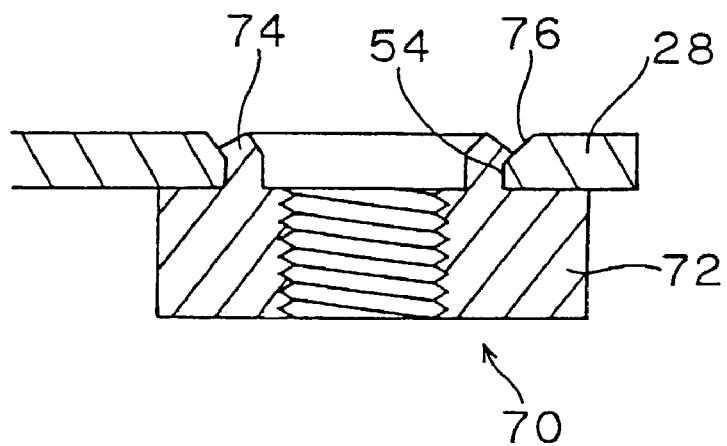
FIG. 10 is a sectional view showing the state of the caulking nut of the modification example sticking fast to the attachment hole.
Figure 11:
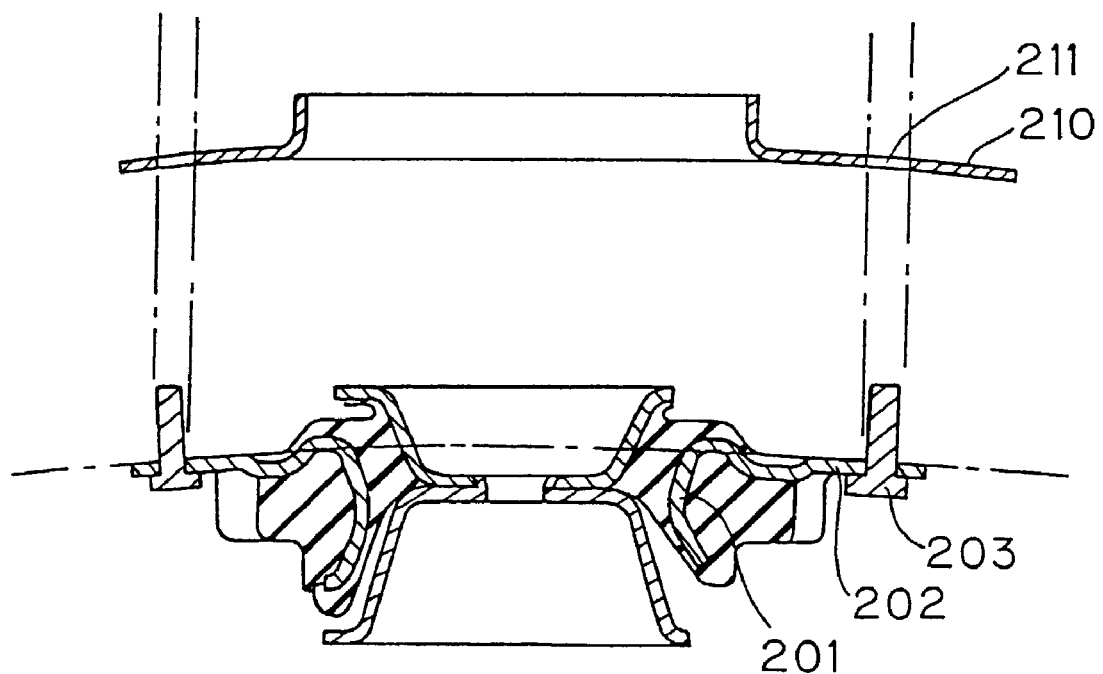
FIG. 11 is a sectional view of the strut mount explaining an effect of the third embodiment described above.
Figure 12:
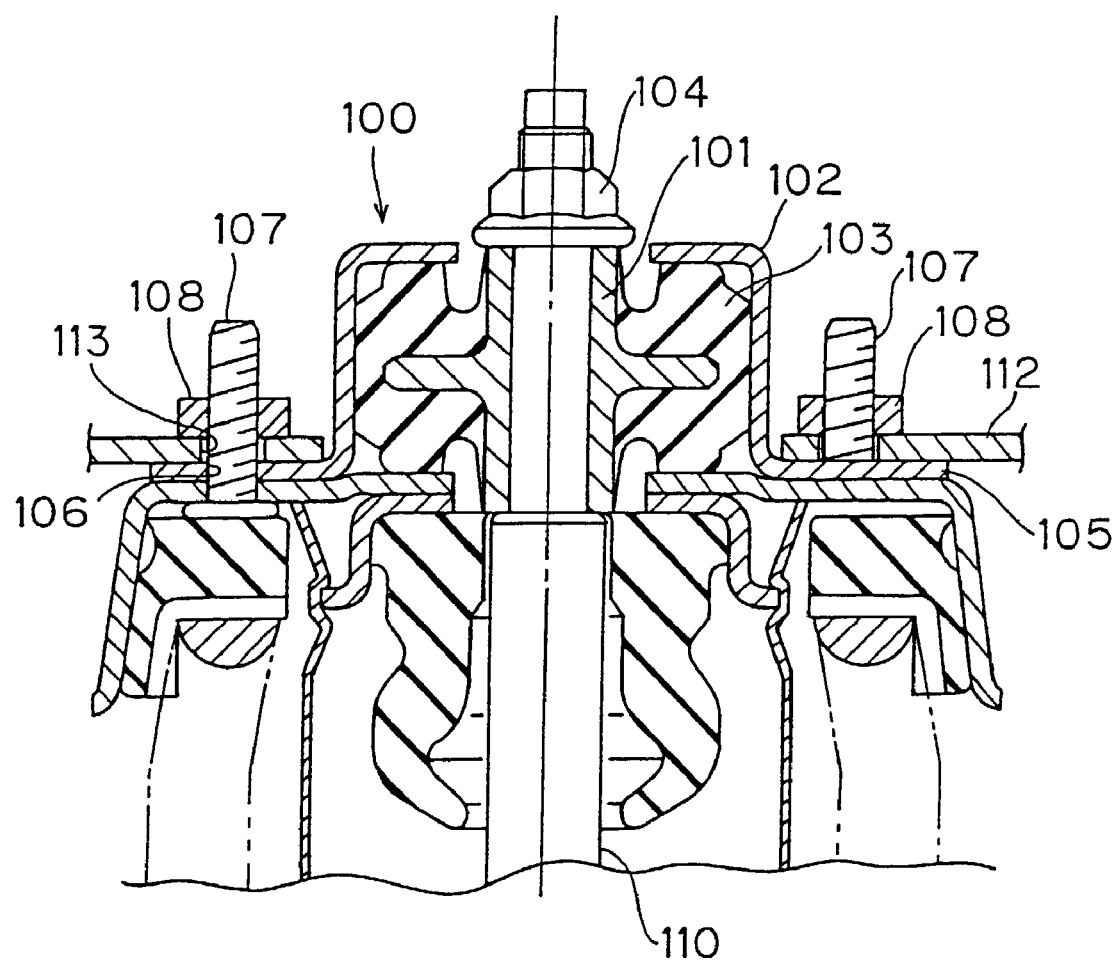
FIG. 12 is a sectional view of conventional strut mount.

FIGS. 9 and 10 show examples of modified caulking nuts. This example relates to the caulking nut 70 the cylindrical portion of which is upset.

The caulking nut 70 comprises a nut portion 72 disposed on the underside of the attachment piece 28 and a cylindrical portion 74 that is inserted into the nut attachment hole 54 from the underside. The caulking nut 70 is caulked, upset and secured to the nut attachment hole 54 by pressurizing and upsetting the cylindrical portion 74 outwardly. For the purpose of making harder than the attachment piece 28, the caulking nut 70 is a hardened steel product.

Having larger diameter than the nut attachment hole 54, the nut portion 72 gets caught in the circumferential edge of the nut attachment hole 54 so as not to slip through and come out of the attachment piece 28 upwardly. On the inner circumferential surface of the nut portion 72, screw threads are cut, wherein the bolt 4 is screwed.

The cylindrical portion 74 has an outside diameter enough to insert into the nut attachment hole 54, and its inside diameter is larger than the I.D. of the nut portion 72 so as not to deform the screw threads of the nut portion 72 when being caulked. Having a chamfering 76 on the above side of the circumferential edge of the nut attachment hole 54, the upsetting upper extremity of the cylindrical portion 74 is gotten caught so as not to slip through and come out of the caulking nut 70 downwardly.

INDUSTRIAL APPLICABILITY

According to the strut mount of the present invention, rigidity can be raised without thickening the attachment plate of a vehicle body to improve vehicle running stability, by curving the attachment piece of the outer member and the attachment plate of the vehicle body in the form of a sphere.

Besides, since the non-fastening surface portion is provided by being lowered via a different level portion around the fastening surface portion of the attachment piece of the outer member to the vehicle body, the rubber in a cavity of the forming die is prevented from getting into the fastening surface, thus keeping the rubber burr from being produced on the fastening surface.

Furthermore, the attachment plate can be curved by the use of the caulking nut stuck to the underside of the attachment piece of the outer member, without enlarging the bolt hole of the attachment plate of the vehicle body, the weight of the products can also be reduced by thinning the plate thickness, and cost reduction can be accomplished by laborsaving during operations.

What is claimed is:

1. A strut mount comprising an inner member to which an upper extremity of a rod of a buffer is fixed, an outer member attached to a vehicle body while surrounding an outer circumference of the inner member, and a rubber elastomer interposed between the inner and outer members to dampen vibration:

wherein the outer member is provided with an attachment piece that is fitted and secured using bolts to an attachment plate of the vehicle body from underneath, wherein the attachment piece comprises (a) bolt-fastening surface regions having a curvature of a partial sphere corresponding to a curved lower surface of the attachment plate, and (b) an upward convex portion inward of the bolt-fastening surface regions, said upward convex portion protruding from the partial sphere toward the attachment plate.

2. The strut mount as set forth in claim 1, wherein the elastomer is a rubber elastomer stuck to the inner and outer members by means of die forming:

wherein the bolt-fastening surface regions are exposed from the rubber elastomer and tightened to the attachment plate of the vehicle by the bolts, and a non-fastening surface portion of plane form is provided around the bolt-fastening surface regions by being lowered via a different level portion.

3. The strut mount as set forth in claim 2, wherein the rubber elastomer is formed by preventing the rubber elastomer from coming into the bolt-fastening surface regions by pressing a forcing surface portion provided on a forming die against the non-fastening surface portion.

4. The strut mount as set forth in claim 1, wherein both the attachment piece of the outer member and the attachment plate of the vehicle body are fastened by tightening a bolt screwed to a nut, which is caulked and secured on the lower surface side of the attachment piece of the outer member, from above the attachment plate of the vehicle body.

5. The strut mount as set forth in claim 4, wherein the nut is a caulking nut with a cylindrical portion that is inserted into a nut attachment hole formed on the attachment piece of the outer member, the caulking nut with the upsetting cylindrical portion being stuck to the attachment piece.

6. The strut mount as set forth in claim 4, wherein the nut is a caulking nut with a cylindrical portion that is inserted into a nut attachment hole formed on the attachment piece of the outer member, the caulking nut being stuck to the attachment piece by pressurizing the circumference of the nut attachment hole from the direction square to the attachment piece plate surface and diminishing the nut attachment hole in diameter.

7. The strut mount as set forth in claim 6, wherein the outer circumferential surface of the cylindrical portion of the caulking nut is corrugated, and an extra wall surrounding the nut attachment hole cuts into the corrugated outer circumferential surface of the cylindrical portion as the nut attachment hole is diminished in diameter, the extra wall acting as a steady rest to restrain the caulking nut from turning together with the bolt.

8. A strut mount comprising:
an inner member to which an upper extremity of a rod of a buffer is to be fixed;
an outer member surrounding an outer circumference of the inner member, said outer member being provided with an attachment piece fitted and secured to an attachment plate of a vehicle body from underneath, said attachment piece (i) having a lower surface on which nuts are caulked and secured, (ii) comprising (a) bolt-fastening surface regions having a curvature of a partial sphere corresponding to a curved lower surface of the attachment plate and (b) an upward convex portion inward of the bolt-fastening surface regions, said upward convex portion protruding from the partial sphere toward the attachment plate, and (iii) being fastened to the attachment plate of the vehicle body with bolts screwed downward to the nuts through the attachment plate of the vehicle body; and
a rubber elastomer interposed between the inner and outer members to dampen vibration and enclosing the outer member, wherein the lower surface of the attachment piece has around each nut the bolt-fastening surface region that is not covered with the rubber elastomer.

9. A strut mount comprising:
an inner member to which an upper extremity of a rod of a buffer is to be fixed;
an outer member surrounding an outer circumference of the inner member, said outer member being provided with an attachment piece fitted and secured to an attachment plate of a vehicle body from underneath, said attachment piece (i) having a lower surface on which nuts are attached, (ii) comprising (a) bolt-fastening surface regions having a curvature of a partial sphere corresponding to a curved lower surface of the attachment plate, and (b) an upward convex portion inward of the bolt-fastening surface regions, said upward convex portion protruding from the partial sphere toward the attachment plate, and (iii) being fastened to the attachment plate of the vehicle body with bolts screwed downward to the nuts through the attachment plate of the vehicle body; and
a rubber elastomer interposed between the inner and outer members to dampen vibration and enclosing the outer member, wherein the lower surface of the attachment piece has around each nut the bolt-fastening surface region that is not covered with the rubber elastomer.

10. A strut mount comprising:
an inner member to which an upper extremity of a rod of a buffer is to be fixed;
an outer member surrounding an outer circumference of the inner member, said outer member being provided with an attachment piece fitted and secured to an attachment plate of a vehicle body from underneath, said attachment piece comprising (a) bolt-fastening surface regions having a curvature of a partial sphere corresponding to a curved lower surface of the attachment plate and (b) an upward convex portion inward of the bolt-fastening surface regions, said upward convex portion protruding from the partial sphere toward the attachment plate, said upward convex portion protruding from the partial sphere toward the attachment plate, wherein both the attachment piece of the outer member and the attachment plate of the vehicle body are fastened with bolts screwed to nuts; and
a rubber elastomer interposed between the inner and outer members to dampen vibration and enclosing the outer member, wherein the lower surface of the attachment piece has around each nut the bolt-fastening surface region that is not covered with the rubber elastomer.

* * * * *